United States Patent [19]
Stamps et al.

[11] 3,776,192
[45] Dec. 4, 1973

[54] ANIMAL FEEDING APPARATUS

[75] Inventors: Otis C. Stamps; David W. Neikirk, both of Clovis, N. Mex.

[73] Assignee: Iject-O-Meter Manufacturing Co., Inc., Clovis, N. Mex.

[22] Filed: Aug. 17, 1972

[21] Appl. No.: 281,513

[52] U.S. Cl. .............................. 119/51.11, 119/72
[51] Int. Cl. ............................................. A01k 5/02
[58] Field of Search ..................... 119/51 R, 51.11, 119/71, 72, 75; 222/320, 372

[56] References Cited
UNITED STATES PATENTS

| | | | |
|---|---|---|---|
| 3,192,902 | 7/1965 | Gammill | 119/51.11 |
| 3,352,286 | 11/1967 | Pickelsimer | 119/71 X |
| 3,307,521 | 3/1967 | Tavera et al. | 119/51.11 X |
| 3,037,481 | 6/1962 | Kloss | 119/71 |
| 3,196,835 | 7/1965 | Bergevin | 119/51.11 |

Primary Examiner—Louis G. Mancene
Assistant Examiner—J. N. Eskovitz
Attorney—J. Vincent Martin et al.

[57] ABSTRACT

An apparatus for delivering a measured amount of fluid feed to animals having a housing with a feed chamber therein, a pump with its inlet connected to the feed chamber and its outlet connected to deliver feed to a feed line, a timer connected to control the operation of the pump to cause the pump to pump for a preset period of time and thus deliver a preselected quantity of feed, means for stirring feed within said chamber, means for heating feed within said chamber, and a wheeled vehicle on which said housing is mounted.

11 Claims, 2 Drawing Figures

PATENTED DEC 4 1973

3,776,192

ANIMAL FEEDING APPARATUS

BACKGROUND OF THE INVENTION

With the increased shipment of animals during recent years, particularly the shipment of calves to feed lots, it has become important to assure that each animal receive at least a minimum of feed to protect the animals health and well being during the trip. Open feeding of animals requires substantial time and has resulted in the failure of some of the animals receiving sufficient feed to assure that they do not become weakened or sick.

It has been found that animals can be moved singly through chutes at a stop during their trip and at the end of the trip and rapidly fed with a fluid feed, such as gruel. If the animals receive the desired amount of feed quickly, a minimum of time is taken and the health and well being of the animals is maintained.

SUMMARY

The present invention relates to such animal feeding apparatus.

It is an object of the present invention to provide an improved animal feeding apparatus which rapidly delivers a preselected amount of fluid feed to each of a plurality of animals as the animals are moved past the feeding area.

The improved animal feeding device includes a housing mounted on a trailer with a feed chamber therein, a pump connected to pump feed from the chamber to a feed line and a timer controlling the operation of the pump and actuated from a position near the feed nozzle on the end of the feed line to cause the pump to be operated for a preset period of time to thereby pump a preselected amount of feed through the feed line.

DESCRIPTION OF THE PREFERRED EMBODIMENT

Figure 1:
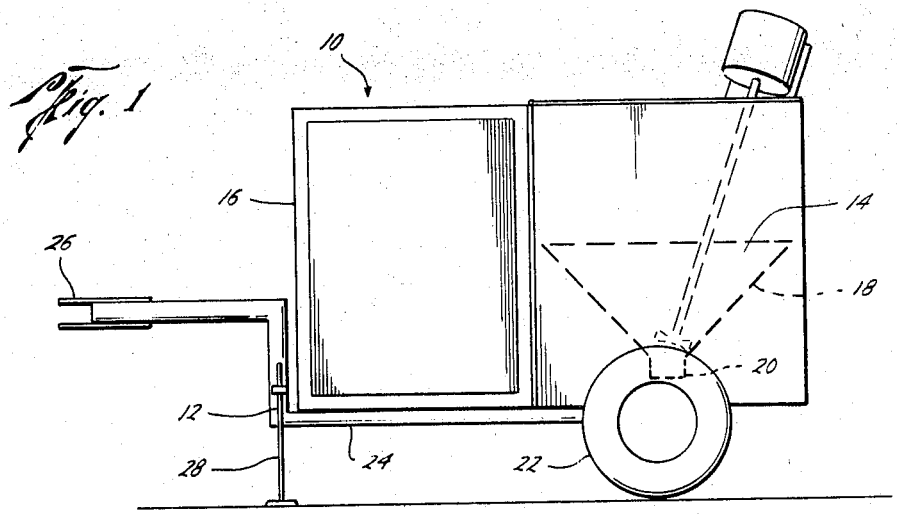
FIG. 1 is a side elevation view of the animal feeding apparatus of the present invention which is trailer mounted.

The animal feeding apparatus 10 illustrated in FIG. 1 is portable by virtue of its being mounted on the trailer 12. The feed chamber 14 is defined within the housing 16 having the tapered bottom 18 with the outlet well 20 defined at the lower end of the bottom 18. The trailer 12 includes the wheels 22 supporting the frame 24, the hitch 26 and the leveling jack 28. The housing 16 is supported on the frame 24. With the apparatus 10 being mounted on a wheeled vehicle, it is easily moved to the site where the animals are to be fed.

Figure 2:
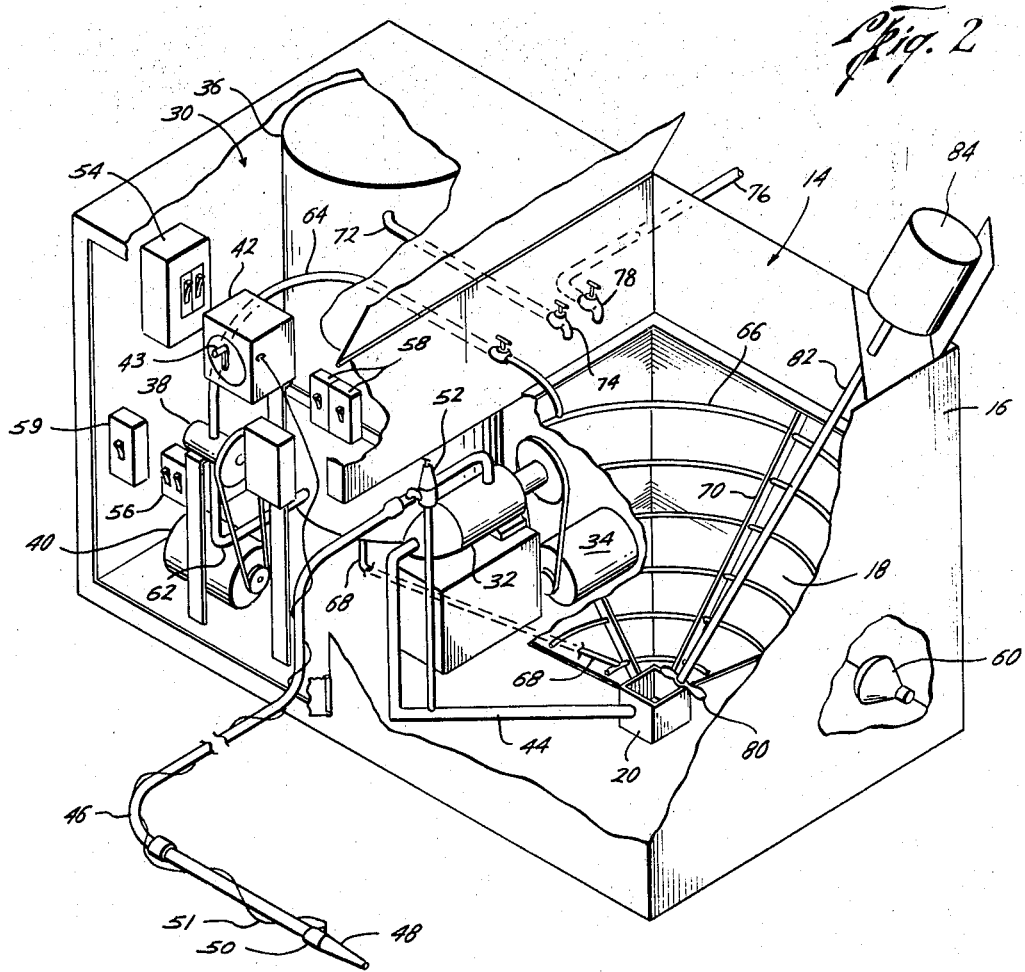
FIG. 2 is a perspective view of the animal feeding apparatus of the present invention with portions broken away to further illustrate the details of the apparatus.

As shown in FIG. 2 the housing 16 is divided into two portions, the feed chamber 14 and the equipment chamber 30. The feed pump 32 which is driven by motor 34, the water heating tank 36, the water pump 38 which is driven by motor 40, the timer 42 and the other switches and controls (hereinafter described) are mounted within the equipment chamber 30 of housing 16. Line 44 connects from outlet well 20 to the inlet of feed pump 32. The outlet from feed pump 32 connects to feed line 46 which terminates in feed nozzle 48. Switch 50, which is preferably positioned on feed line 46 near feed nozzle 48, is connected by lead 51 to actuate timer 42. Pressure relief valve 52 connects from line 46 near the outlet of pump 32 to line 44 to provide a pressure relief by-pass for pump 32.

The timer 42 is of a type which, when actuated, causes power to be delivered to motor 34 for a preselected length of time to thereby cause a desired amount of feed to be pumped from feed chamber 14 to feed nozzle 48. Timer 42 is provided with an adjustment arm 43 which is used to preset the time period during which power is delivered to the motor 34. Also timer 42 is automatically reset for the next actuation by switch 50 each time it completes its cycle of delivering power to motor 34 for the preselected time period.

The controls within the equipment chamber 30 include the circuit breaker box 54, the switch 56 controlling the heating in tank 36, the switches 58 controlling power delivered to timer 42 and the thermostat 59. Thermostat 59 controls heat lamp 60 which is actuated by thermostat 59 sensing the approach of freezing conditions. When thermostat does actuate heat lamp 60 it provides sufficient heat to prevent any freezing of water or fluid feed within housing 16.

Means for heating the fluid feed within feed chamber 14 are provided. Line 62 connects from water heater tank 36 to pump 38 and line 64 connects from pump 38 to the heating coils 66 within the feed chamber 14. The other end of coils 66 is connected by line 68 to the tank 36. Thus, when pump 38 is operating heated water from tank 36 is circulated through the coils 66 and back to the tank 36. The bracket 70 supports the coil 66 within feed chamber 14.

As used herein the term fluid feed is intended to mean a feed suitable for animals which by virtue of its fluidity is readily pumped with the above described apparatus. Hot water from tank 36 may be supplied to chamber 14 through line 72 under control of valve 74 and any other suitable liquid can be supplied through line 76 under control of valve 78 to render the feed sufficiently fluid for pumping. The stirring means for the feed includes the stirring element 80 which is supported on shaft 82 and driven by motor 84 mounted on the top of housing 16. The stirring action is provided to maintain the fluidity and uniformity of the feed.

In use the feed chamber is loaded with the desired feed material and any water or other liquid which is to be included therein. With the switch 50 set near the feed nozzle 48, electric power supplied to the apparatus, the heating means operating if needed and timer 42 preset to the preselected time, the apparatus is ready for use. The animals are brought close enough to receive the feed nozzle individually and after it is inserted in the mouth and to the stomach of the animal, the switch 50 is actuated. This starts the timer 42 which starts the motor 34. The pump 32 pumps fluid feed through the feed line 46 and to the animal and continues to pump until timer 42 concludes its timing cycle. This shuts off motor 34 and pump 32 until switch 50 is again actuated to feed the next animal.

The improved animal feeding apparatus of the present invention thus provides individual feeding of animals with each animal receiving a preselected amount of feed. This assures that all animals receive an adequate amount and that none are overfed or underfed. With this apparatus, animals can be transported without becoming sick or weakened for lack of nourishment and such feeding may be quickly and easily accomplished. The warm feeding in preselected quantities allows the animal to recover from the travelling quickly and to feed normally thereafter.

What is claimed is:

1. An apparatus for measured feeding of animals comprising
   a housing,
   said housing defining a chamber in which a fluid feed is stored,
   a feeding line,
   a feeding nozzle connected to the end of said feeding line and of sufficient length to be inserted through the animal's mouth into its stomach,
   pump means having an inlet connected to said chamber and an outlet connected to said feeding line for pumping a preselected amount of feed directly into the animal's stomach, and
   means for actuating said pump.

2. An apparatus according to claim 1 including
   a wheeled vehicle,
   said housing and pump means being mounted on said vehicle to render said apparatus readily movable.

3. An apparatus according to claim 1 including means for stirring feed in said chamber.

4. An apparatus according to claim 1 including means for heating feed within said chamber.

5. An apparatus according to claim 4, wherein said heating means includes
   a coil positioned within said chamber, and
   means for circulating hot water through said coil.

6. An apparatus according to claim 5 wherein said circulating means includes
   a water heater tank,
   a pump having an inlet and an outlet, and
   means connecting said water heater tank to said pump inlet, said pump outlet to said coil and said coil to said tank whereby water is pumped from said tank through said coil and back to said tank.

7. An apparatus according to claim 4, including
   a heat lamp mounted in said housing and directed toward said chamber.

8. An apparatus according to claim 1, including a timer for operating said pump means, and
   a switch connected to actuate said timer.

9. An apparatus according to claim 8 wherein
   said switch is positioned near the feeding end of said feeding line.

10. An apparatus according to claim 1, including
    a water heating tank mounted in said housing, and
    means for supplying water from said tank to said chamber.

11. An apparatus according to claim 1 wherein
    said nozzle being of a shape suitable for being inserted in the mouth of animals.

* * * * *